United States Patent [19]

Giuliano et al.

[11] Patent Number: 4,923,354
[45] Date of Patent: May 8, 1990

[54] MAGAZINE WITH MOVABLE SHELVES, FOR THE MATURATION OF CAKES OF SYNTHETIC FOAM MATERIAL

[75] Inventors: Claudio Giuliano, Gambolò; Pier E. Gilardi, Robbio, both of Italy

[73] Assignee: Gestioni Riunite Toscana Gomma S.p.A., Robbio, Italy

[21] Appl. No.: 267,164

[22] Filed: Oct. 24, 1988

[30] Foreign Application Priority Data

Nov. 5, 1987 [IT] Italy ............... 67941 A/87

[51] Int. Cl.$^5$ ............................. F27B 1/08
[52] U.S. Cl. ................... 414/286; 211/151; 414/626; 414/787; 414/143.2
[58] Field of Search ............ 414/331, 626, 266, 267, 414/268, 269, 272, 277, 278, 279, 281, 140.3, 142.6, 143.2, 286, 787; 211/151; 312/297

[56] References Cited

U.S. PATENT DOCUMENTS

| 1,561,664 | 11/1925 | Rathwell | 414/331 |
| 1,599,227 | 9/1926 | Gantvoort | 414/331 |
| 2,831,213 | 4/1958 | Klarmann et al. | 414/277 X |
| 3,683,467 | 8/1972 | Heitzman | 414/286 X |
| 3,818,852 | 6/1974 | Lewis et al. | 414/140.3 X |
| 4,428,304 | 1/1984 | Moser | 312/297 X |
| 4,621,969 | 11/1986 | Berghäll et al. | 414/331 |

FOREIGN PATENT DOCUMENTS

| 3442161 | 5/1986 | Fed. Rep. of Germany | 414/331 |
| 9271 | 1/1977 | Japan | 414/267 |
| 587047 | 1/1978 | U.S.S.R. | 414/281 |

Primary Examiner—Robert J. Spar
Assistant Examiner—Robert S. Katz
Attorney, Agent, or Firm—Young & Thompson

[57] ABSTRACT

A magazine for the maturation of cakes of synthetic foam material, for a plant served by a conveyor belt bringing the cakes for distribution in the magazine, and by an overhead crane with a gripper intended for lifting a cake from the belt conveyor, for shifting it laterally and for depositing the same into a maturation space, which comprises stands arranged parallel to and at the side of the belt conveyor; each stand comprises a frame which supports a fixed lower shelf whose width and length are adapted to the width and length of the cakes to be received, and above the fixed shelf, at vertical mutual distances somewhat greater than the height of the cakes to be received, a plurality of movable shelves for receiving the cakes; each movable shelf is shiftable between a working position, in which it constitutes a surface whose width and length are adapted to the width and length of the cakes to be received, and a rest position, in which it leaves free the access from above to the shelf lying below. The rest position of the movable shelves is preferably arranged below the fixed shelf.

5 Claims, 2 Drawing Sheets

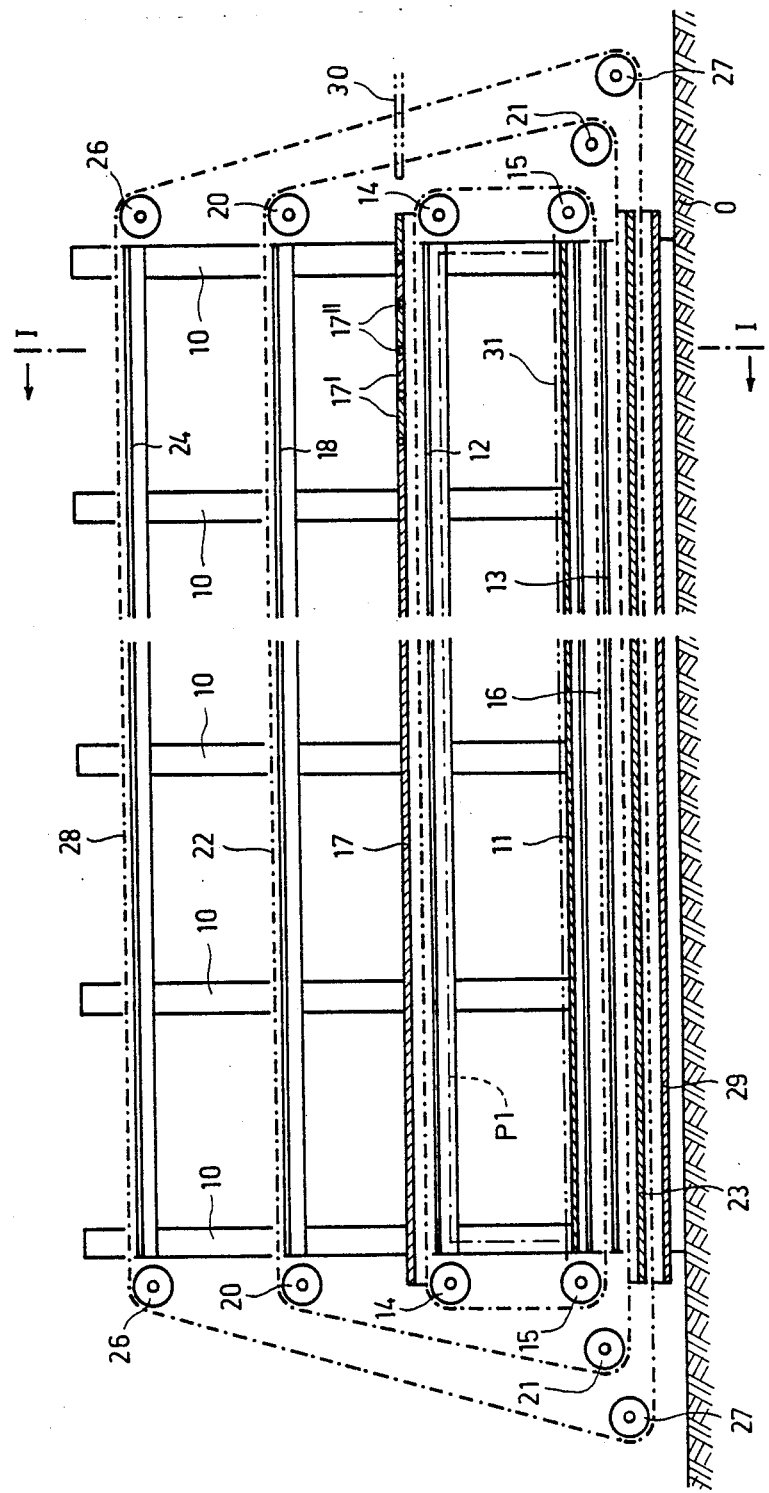

MAGAZINE WITH MOVABLE SHELVES, FOR THE MATURATION OF CAKES OF SYNTHETIC FOAM MATERIAL

BACKGROUND OF THE INVENTION

The subject of the present invention is a magazine for the maturation of cakes of synthetic foam material.

In the manufacture of synthetic foam materials, the material is made to expand in a continuous manner on a moving belt conveyor, so as to form a manufactured article having a constant, usually at least approximately rectangular section, which is cut into predetermined lengths, normally measuring several meters. At the output end of the plant, the blocks thus produced, known as cakes, have reached a consistency which allows them to be handled, but are not yet at their final consistency, nor are the exothermal chemical reactions induced in their interior exhausted, whereby the cakes must be stored and allowed to mature for a certain period of time amounting to several hours before they can finally be used. It is always very desirable, and in certain cases essential, that these cakes should not be superposed on each other during this storage step. This is because, in the case of superposition, the weight of the cakes lying above could deform the cakes lying below, which have not yet reached their full mechanical strength, and also because the direct superposition of the cakes would reduce the total surface exposed to direct contact with the atmosphere and hence the heat exchange, so that the exothermal chemical reactions still going on inside the cakes would give rise to their overheating. Overheating would lead to deterioration of the quality of the material, especially to yellowing thereof, while in extreme cases a spontaneous combustion could occur.

The most simple way to store the manufactured cakes without placing them the one on top of each other is to pick up each freshly cut cake by means of an overhead crane with a gripper, to raise it, to shift the same laterally and to deposit it, on the side of the other cakes previously produced, on a maturation surface from which the cakes will be taken away by means of the same process at the end of the maturation period. The drawback with this way of proceeding is an insufficient exploitation of the warehouse space, which must have a very large area since use is only made of the equivalent of the height of a cake.

In order to exploit the height of a magazine as well, maturation plants have been devised which comprise a magazine with many cells arranged in a meshwork on several levels, each cell being provided with a moving belt and having a size corresponding to that of a cake. At the output end of the expansion plant, the cake being formed is received on a belt conveyor mounted on a carrier which can move transversely and in elevation and, when the cake reaches the predetermined length and it has been cut, the carrier is shifted laterally and in elevation to bring the cake in front of an empty magazine cell, whereupon the cake is made to slide from the conveyor belt of the carrier to that of the cell. While this operation is taking place, a second carrier with a conveyor belt is positioned at the output end of the expansion plant in order to receive the new cake being formed. Even with this type of maturation plant, however, the magazine space is not completely exploited, because all the space needed to manoeuvre the carriers, which are shiftable laterally and in elevation and whose length is equal to that of the cakes, must be left free. In addition, it is considerably costly to have a pair of carriers shiftable laterally and in elevation.

In order to reduce the cost of the plant, it has been proposed to replace the pair of carriers with a distributing arm fitted with a conveyor belt, articulated to the output end of the expansion plant and suitable for being oriented so as to bring its movable end in front of the magazine cells. The operation of such a plant is rendered possible by the fact that the cakes of expanded material can be deformed to a certain extent; of course, during this operation, the cakes are curved both during their passage from the output end of the expansion plant to the distributing arm and during their passage from the distributing arm to the maturation cell. However, the limited deformability of the cakes imposes certain limits to the orientability allowed for the distributing arm, and hence does not allow the use of a large number of cells. In this plant, too, the space required for the orientation of the distributing arm must be left free and cannot be utilizied.

BRIEF SUMMARY OF THE INVENTION

The object of the present invention is the creation of a magazine particularly suitable for the maturation of cakes of synthetic expanded material, which should allow an optimal exploitation of the available space, should not require particularly expensive equipment and should not intrinsically pose any limit to the number of cells intended for receiving the cakes in the process of maturation.

This object is attained, according to the invention, in a magazine for the maturation of cakes of synthetic foam material, for a plant served by a conveyor belt bringing the cakes for distribution in the magazine, and by an overhead crane with a gripper, intended for lifting a cake from the belt conveyor, for shifting it laterally and for depositing the same in a maturation space, by the fact that said magazine comprises at least one stand arranged parallel to and at the side of said conveyor belt, comprising a frame which supports a fixed lower shelf whose width and length are adapted to the width and length of the cakes to be received, and above said fixed shelf, at vertical mutual distances somewhat greater than the height of the cakes to be received, a plurality of means for receiving said cakes, each of such means being shiftable between a working position, in which it constitutes a surface whose width and length are adapted to the width and length of the cakes to be received, and a rest position, in which it leaves free the access from above to the shelf lying below.

Thanks to such structure, each means of reception, designed to serve in its working position as a surface for the reception of a cake, can be brought into a rest position in which it leaves accessible from above the shelf lying below in the working position. The stand can therefore be filled by means of the overhead crane with a gripper, starting from the lower fixed shelf, and shifting, after each each cake has been deposited on a shelf, the reception means immediately above the shelf just loaded from its rest position to its working position. The same operations in the reverse order subsequently enable the overhead crane with its gripper to pick up the now matured cakes and to forward them to the further manufacturing operations, either by means of the belt conveyor which has previously brought them, or by any other means. The number of shelves superposed in each stand is limited solely by the amount of vertical space which is available under the overhead crane and can be served by said crane. Several stands can be placed side by side, and their number is limited solely by the amount of horizontal space which is available and can be served by the overhead crane. The entire system does not include any unusable space, and thus it enables the better use to be made of the space actually available. The means employed for handling the cakes, namely a simple overhead crane with a gripper, is the most economical possible for the envisaged application, and it substantially corresponds to that used in the simplest of the former plants mentioned above. The stand with movable shelves according to the invention is more economical than a corresponding plurality of superposed cells each equipped with a conveyor belt. Lastly, the operaton of the entire system is simple and it could easily be automated.

Said plurality of reception means preferably comprises: a plurality of pairs of lateral upper horizontal guides supported by the frame above the fixed shelf at the stated vertical distances, and a corresponding plurality of pairs of lateral lower horizontal guides supported by the frame under the fixed shelf at short reciprocal distances; return means placed at the ends of each upper and lower horizontal guide; for each double pair consisting of a pair of upper guides and the corresponding pair of lower guides, a pair of continuous chains running along said guides and passing over said return means; and for each pair of chains a movable shelf extending transversely from one chain to the other and extending longitudinally for a length adapted to that of the cakes to be received. Each movable shelf may be formed of a plurality of articulated members in the form of slats extending from one of the respective chains to the other, and connected to them.

BRIEF DESCRIPTION OF THE DRAWINGS

These and other characteristics and advantages of the subject of the invention will be more readily understood from the following description of a preferred embodiment, having the character of a non limitative example and diagrammatically shown in the attached drawings, in which:

FIG. 2 shows a longitudinal section of a stand according to the invention, taken along line II—II of FIG. 1.

DETAILED DESCRIPTION OF THE PREFERRED EMBODIMENT

Figure 1:
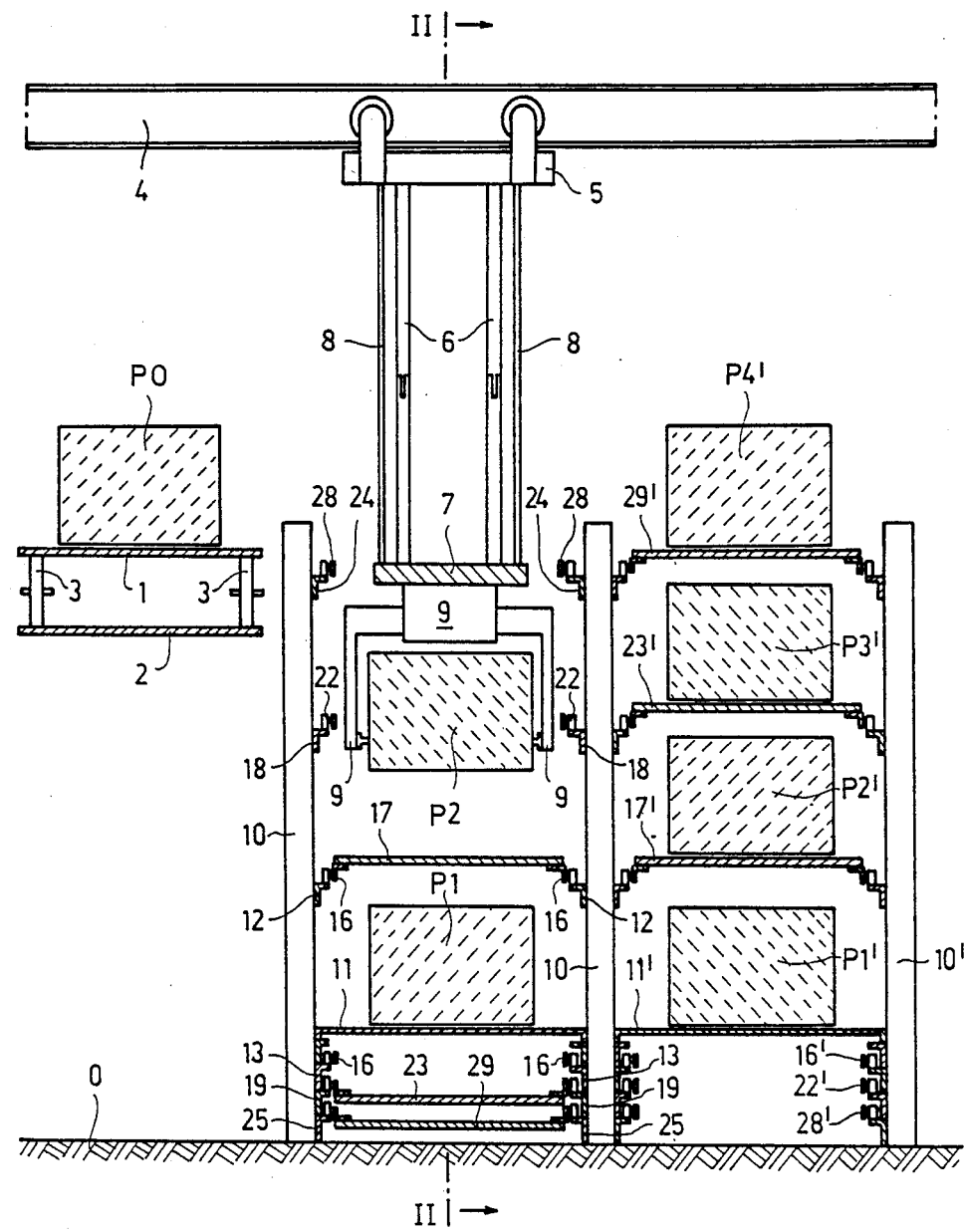
FIG. 1 shows a cross section, taken along line I—I of FIG. 2, of a magazine according to the invention, comprising two stands arranged side by side, and also illustrates the conveyor belt which brings the cakes and the overhead crane used for their handling.

With reference, first of all, to FIG. 1, the numbers 1 and 2 respectively indicate the active branch and the return branch, driven by return wheels 3, of a conveyor belt which carries the cakes to be forwarded to the maturation and which, if required, may be then employed to take away the matured cakes. A cake P0 is shown on belt 1; in general it may be a cake which is moving forward gradually as it is formed, and which will then be cut when it has reached the required length.

Number 4 indicates one of the suspension rails of an overhead crane, which comprises: a trolley 5 travelling in either direction along rail 4, articulated arms 6 guiding a lengthwise beam 7, cables 8 for raising and lowering the lengthwise beam 7, and along said beam 7 some grippers 9 suitable for gripping with their jaws the cakes to be handled. Another cake P2 is shown in the state of being held by said grippers 9. The lengthwise beam 7 with grippers 9 extends over the whole length of the cakes to be handled.

The parts so far described substantially correspond to the components of a plant of the type in which the cakes to be matured are simply deposited side by side each other, except that the overhead crane 4-9 is designed to have a longer vertical travel distance.

The magazine according to the invention, as represented in FIGS. 1 and 2, comprises one or more stands, each of which includes a plurality of uprights 10 fixed to a floor 0 and supporting at a certain height over said floor a fixed shelf 11 whose width and length are adapted to the width and length of a cake to be received. A cake P1 is shown as deposited on the fixed shelf 11, by means of a solid line in FIG. 1 and by means of a dot-and-dash line in FIG. 2. Two of such stands are illustrated side by side in FIG. 1, where it can be seen that the uprights 10 on the right of the first stand, which is arranged on the left, can also be used for the second stand which, on its turn, comprises further uprights 10' and a fixed shelf 11'. It is to be understood that any number of stands may thus be placed side by side, consistently with the available space and the range of horizontal translation of the overhead crane 4-9.

Above the fixed shelf 11, uprights 10 carry a pair of upper lateral horizontal guides 12 whose vertical distance from the fixed shelf 11 is somewhat greater than the height of the cake to be received. Other pairs of upper lateral horizontal guides, namely the two pairs 18 and 24 in the shown example, are supported at similar vertical distances by uprights 10. Each pair of upper lateral horizontal guides 12, 18, 24 situated above the fixed shelf 11 is accompanied by a corresponding pair of lower lateral horizontal guides 13, 19, 25, respectively, located at short vertical distances below the fixed shelf 11.

Return wheels 14 are mounted at the ends of the upper guides 12, and return wheels 15 are mounted at the ends of the lower guides 13. Similar return wheels 20, 26 and 21, 27 are installed at the ends of the other upper guides 18, 24 and the corresponding lower guides 19, 25.

A pair of endless chains 16 runs along the upper guides 12, over the return wheels 14 and therefrom over the return wheels 15 and along the lower guides 13. In the same way, a pair of endless chains 22 runs along the upper guides 18, over the return wheels 20 and therefrom over the return wheels 21 and along the lower guides 19, while a further pair of endless chains 28 runs along the upper guides 24, over the return wheels 26 and therefrom over the return wheels 27 and along the lower guides 25.

Between the chains 16 forming a pair there extend transverse members connected to said chains, said members in their whole forming an articulated movable shelf 17 carried by the chains 16. However, said movable shelf 17 does not extend over the entire length of chains 16, but only over a length adapted to the length of a cake to be received, namely substantially over the length of the stand. As far as the whole of their remaining length is concerned, chains 16 run along the respective guides and over the respective return wheels without having any transverse member that connects them to each other. Similar arrangements of articulated movable shelves 23, 29, whose length is adapted to the length of the cake to be received and hence to that of the stand, are applied to the other pairs of chains 22 and 28, respectively.

In the light of the arrangement described, it will be understood that, when the respective chains are made to run, each movable shelf 17, 23, 29 can be shifted to a working position above the fixed shelf 11, as illustrated for the movable shelf 17, or to a rest position under the fixed shelf, as illustrated for the movable shelves 23 and 29. When a movable shelf is in its working position, it covers the shelf lying below and it is ready to receive a cake, as it can be seen with regard to shelf 17 in FIG. 1, on which the overhead crane 4-9 can deposit the cake P2. This operation is rendered possible owing to the fact that shelves 23 and 29 which, when in their working positions, would be situated above the shelf in question 17, at the considered time are in their rest positions, whereby the respective chains 22, 28 do not interfere with the operation of the overhead crane, since no member connecting them to each other is present in the working field.

Filling of a stand according to the invention, therefore, takes place in the following manner. Initially, all the movable shelves 17, 23, 29 are brought into their rest positions, whereby the fixed shelf 11 is rendered accessible from above. A cake P1 is deposited on the fixed shelf 11 by means of the overhead crane. The movable shelf 17 is then shifted from its rest position to its working position thus giving rise to the configuration illustrated for the left hand stand in FIG. 1. A cake P2 can then be deposited on the movable shelf 17 by means of the overhead crane. Once this is done, the movable shelf 23 is shifted from its rest position to its working position and on its turn it receives a cake; lastly, the same operation is repeated for the movable shelf 29. At this point the stand is fully loaded, and the overhead crane can move on and load an adjacent stand. In FIG. 1, the right hand stand is illustrated with its shelves 11', 17', 23' and 29' all loaded with cakes P1', P2', P3' and P4', respectively.

It will be clear that, once the cakes thus stored come to the end of their maturation period, the same operations can be carried out in the opposite order to enable each stand to be unloaded by the overhead crane, said cakes being forwarded either to the same belt conveyor 1, this being now used to take the matured cakes away, or to any other removal means.

The articulated shelves of a stand in accordance with the invention can be compared with the conveyor belts of the cells of known magazines with cells arranged in a meshwork, but these latter have at least twice the longitudinal extension of the articulated shelves; for this reason, the magazine according to the invention proves to be somewhat more economical than a known magazine having the same capacity. The application of the invention thus permits, by relatively economical means, the maximal exploitation of both the surface and the height of the space available for the maturation storage of cakes of synthetic foam material. On the other hand, the operating movements required for both the overhead crane and the movable shelves are of the maximum possible simplicity, and thus they do not pose problems for the introduction of a fully automatic control of the plant operation.

The movable shelves may consist of slat like members 17' mutually articulated at 17", as shown at the right hand end portion of the movable shelf 17 according to FIG. 2. These slat like members can be simply connected to the lateral chains, or they may be themselves substituted for the chains along their own longitudinal extension. Instead of being formed of rigid articulated members, the movable shelves could also comprise a flexible manufactured article, for example made of rubber or another elastomeric material.

A description has been given of a preferred structure for shifting the means receiving the cakes from their working positions to to their rest positions and vice versa, and it should be noted that the shelves of this structure, which are articulated and mounted on chains, can also be given a transport function; all or part of the same can thus provide for forwarding the matured cakes to successive manufacturing processes without needing them to be transferred by means of the overhead crane. For example, shelf 17 according to FIG. 2 may forward the cakes matured thereon onto a conveyor diagrammatically shown in phantom at 30.

Also the fixed shelves can be entrusted with a similar transport function, by embodying them too in a manner similar to the movable shelves, or as conveyor belts. For example, the fixed shelf 11 according to FIG. 2 may include a conveyor belt diagrammatically shown in phantom at 31, in order to allow horizontal displacement of the cakes matured thereon.

However, it is to be understood that means for the reception of cakes different from those described could also be adopted. For example, in those positions where provision has been made for the use of upper lateral horizontal guides, raisable shelves in the form of a trapdoor, comprising either a single piece or two symmetrical parts, could be articulated to the supporting frame.

As said, the number of superposed shelves in a stand can be varied consistently with the vertical space available, and the number of adjacent stands can be varied consistently with the surface space available.

We claim:

1. In a plant for the maturation of cakes of synthetic foam material, comprising a maturation space, a belt conveyor bringing the cakes for distribution in the maturation space, and an overhead crane having a gripper, for lifting a cake from the belt conveyor, for shifting the cake laterally and for depositing the cake into the maturation space; a magazine comprising at least one stand arranged parallel to and side by side of the belt conveyor, said stand comprising a frame, an operatively fixed lower shelf supported by said frame, the width and length of said fixed shelf being adapted to the width and length of the cakes to be received, and a plurality of means for receiving said cakes, arranged above said fixed shelf at vertical mutual distances somewhat greater than the height of the cakes to be received, each of such means being shiftable between a working position, in which it constitutes a surface whose width and length are adapted to the width and length of the cakes to be received, and a rest position, in which it leaves free the access from above to the shelf lying below, said plurality of reception means comprising: a plurality of pairs of lateral upper horizontal guides supported by the frame above the fixed shelf at said vertical distances and a corresponding plurality of pairs of lateral lower horizontal guides supported by the frame under the fixed shelf at short mutual distances; return means placed at the ends of each upper and lower horizontal guide; for each double pair formed by a pair of upper guides and the corresponding pair of lower guides, a pair of continuous chains running along said guides and passing over said return means; and for each pair of chains one of a plurality of movable shelves extending transversely from one chain to the other and extending longitudinally over a length adapted to the length of the cakes to be received.

2. A maturation magazine as set forth in claim 1, wherein at least a part of the movable shelves is given a function for the transport of matured cakes towards further manufacturing processes.

3. A maturation magazine as set forth in claim 1, wherein each movable shelf comprises a plurality of slat-like articulated members extending from one of the respective chains to the other and linked to said chains.

4. A maturation magazine as set forth in claim 1, which comprises a plurality of said stands placed side by side.

5. In a plant for the maturation of cakes of synthetic foam material, comprising a maturation space, a belt conveyor bringing the cakes for distribution in the maturation space, and an overhead crane having a gripper, for lifting a cake from the belt conveyor, for shifting the cake laterally and for depositing the cake into the maturation space; a magazine comprising at least one stand arranged parallel to and side by side of the belt conveyor, said stand comprising a frame, an operatively fixed lower shelf supported by said frame, the width and length of said fixed shelf being adapted to the width and length of the cakes to be received, and a plurality of means for receiving said cakes, arranged above said fixed shelf at vertical mutual distances somewhat greater than the height of the cakes to be received, each of such means being shiftable between a working position, in which it constitutes a surface whose width and length are adapted to the width and length of the cakes to be received, and a rest position, in which it leaves free the access from above to the shelf lying below, wherein at least a part of the shelves operatively fixed for the reception of the cakes comprise a conveyor to transport the matured cakes.

* * * * *